United States Patent
Fryk et al.

(10) Patent No.: US 6,189,955 B1
(45) Date of Patent: Feb. 20, 2001

(54) OPERATOR ENCLOSURE FOR AN AGRICULTURAL TRACTOR

(75) Inventors: Bruce Kevin Fryk, Waverly; Ronald Lee Jurek, Denver; Bennie Joe Vaughn, Cedar Falls, all of IA (US); Edward Ted Kaczmarczyk, Welland (CA)

(73) Assignee: Deere & Company, Moline, IL (US)

( * ) Notice: Under 35 U.S.C. 154(b), the term of this patent shall be extended for 0 days.

(21) Appl. No.: 09/550,823

(22) Filed: Apr. 18, 2000

(51) Int. Cl.⁷ .................................................. B60R 27/00
(52) U.S. Cl. ................ 296/190.08; 296/190.01; 296/190.03; 296/190.1; 296/102
(58) Field of Search .................. 296/190.08, 190.01, 296/190.03, 102, 205, 190.1; 180/89.12

(56) References Cited

U.S. PATENT DOCUMENTS

| | | | |
|---|---|---|---|
| 4,135,591 | 1/1979 | Eberle | 280/756 |
| 5,094,500 | 3/1992 | Maypole et al. | 296/102 |
| 5,174,622 | 12/1992 | Gutta | 296/102 X |
| 5,280,955 | 1/1994 | Nelson et al. | 180/89.12 X |
| 5,820,199 | 10/1998 | Camplin et al. | 296/102 |
| 5,842,732 | 12/1998 | Daggett et al. | 296/102 |
| 5,961,175 | 10/1999 | Clardy, Jr. | 296/102 |

OTHER PUBLICATIONS

Renault, "Die Kompakten von Renault"cover page, back page Oct. 1999.

*Primary Examiner*—D. Glenn Dayoan
*Assistant Examiner*—Lori L. Coletta

(57) ABSTRACT

An operator enclosure for an agricultural tractor has a rollover protective structure (ROPS) in which the front side of the ROPS extends upward above the left, right and rear sides of the ROPS and terminates at a front upper cross member extending laterally between left and right front upright corner members. A roof pan is placed at the top of the ROPS that has a generally horizontal top panel at about the same height as the front upper cross member. The top panel of the roof curves downward to form left, right and rear side panels extending downward from the top panel to the height of the upper members of the ROPS along the left, right and rear sides. There is no front panel on the roof extending downward from the top panel. The windshield is extended upward into what had previously been the front panel of the roof. This improves the front upward visibility, an feature particularly useful in operating a front end loader on the tractor.

13 Claims, 4 Drawing Sheets

OPERATOR ENCLOSURE FOR AN AGRICULTURAL TRACTOR

BACKGROUND OF THE INVENTION

1. Field of the Invention

The present invention relates to a operator enclosure for an agricultural tractor and specifically to an enclosure having a rollover protective structure (ROPS) with a front upper cross member that is raised relative to the left and right side upper members to improve operator visibility when using a front-end loader.

2. Description of the Related Art

Many modern agricultural tractors have an operator station with a flat floor forward of the operator's seat. This provides greater ease of ingress and egress and improved operator comfort compared to many older designs in which the floor has a raised center portion with lowered foot rests on each side of the raised center portion. To provide the flat floor, the operator station is raised to a higher position relative to the tractor frame than in earlier designs. This results in an overall increase in the height of an operator enclosure, i.e. cab. However, it is generally desired to keep the overall height of the tractor as low as possible, to maximize clearance when entering a building.

Also important in the design of the operator enclosure is the operator visibility. When the tractor is equipped with a front-end loader, it is also important to have upward visibility to view the loader bucket in a raised position. While upward visibility can be improved by raising the height of the enclosure roof, there are practical limits to the height of the tractor as mentioned above. One solution to provide greater upward visibility for a raised loader bucket, without increasing the roof height, is to add a viewing window in the roof of the enclosure. While a viewing window enables the bucket to be seen in a raised position, as the loader bucket is being raised, it must pass through a region where visibility is blocked by the front upper cross member of the enclosure frame. Furthermore, the addition of a viewing window in the roof can decrease the packaging space in the roof area for ventilation ducts, radios, etc. and add significant cost to the tractor.

SUMMARY OF THE INVENTION

The present invention provides an operator enclosure that includes a rollover protective structure (ROPS) in which the front side of the ROPS extends above the left, right and rear sides of the ROPS. The front side is defined by a front upper cross member and left and right upright corner members. A roof pan is placed at the top of the ROPS that has a generally horizontal top panel at about the same height as the upper front cross member. The top panel of the roof is curved downward to form left, right and rear side panels extending downwardly from the top panel to the height of the upper members of the ROPS, along the left, right and rear sides. This roof pan replaces prior roof designs that have a generally horizontal top panel with downwardly depending side panels on all four sides.

By eliminating the downwardly depending front panel of the roof pan and extending the ROPS and the front windshield further upward, a larger front windshield is provided. The windshield has greater upward visibility, enabling viewing of a loader bucket in the raised position through the windshield. A separate viewing window in the roof is not needed, thereby avoiding the zone where the upper front member of the ROPS blocks visibility of the loader bucket. The added cost of a viewing window is also avoided.

DESCRIPTION OF THE PREFERRED EMBODIMENT

Figure 1:
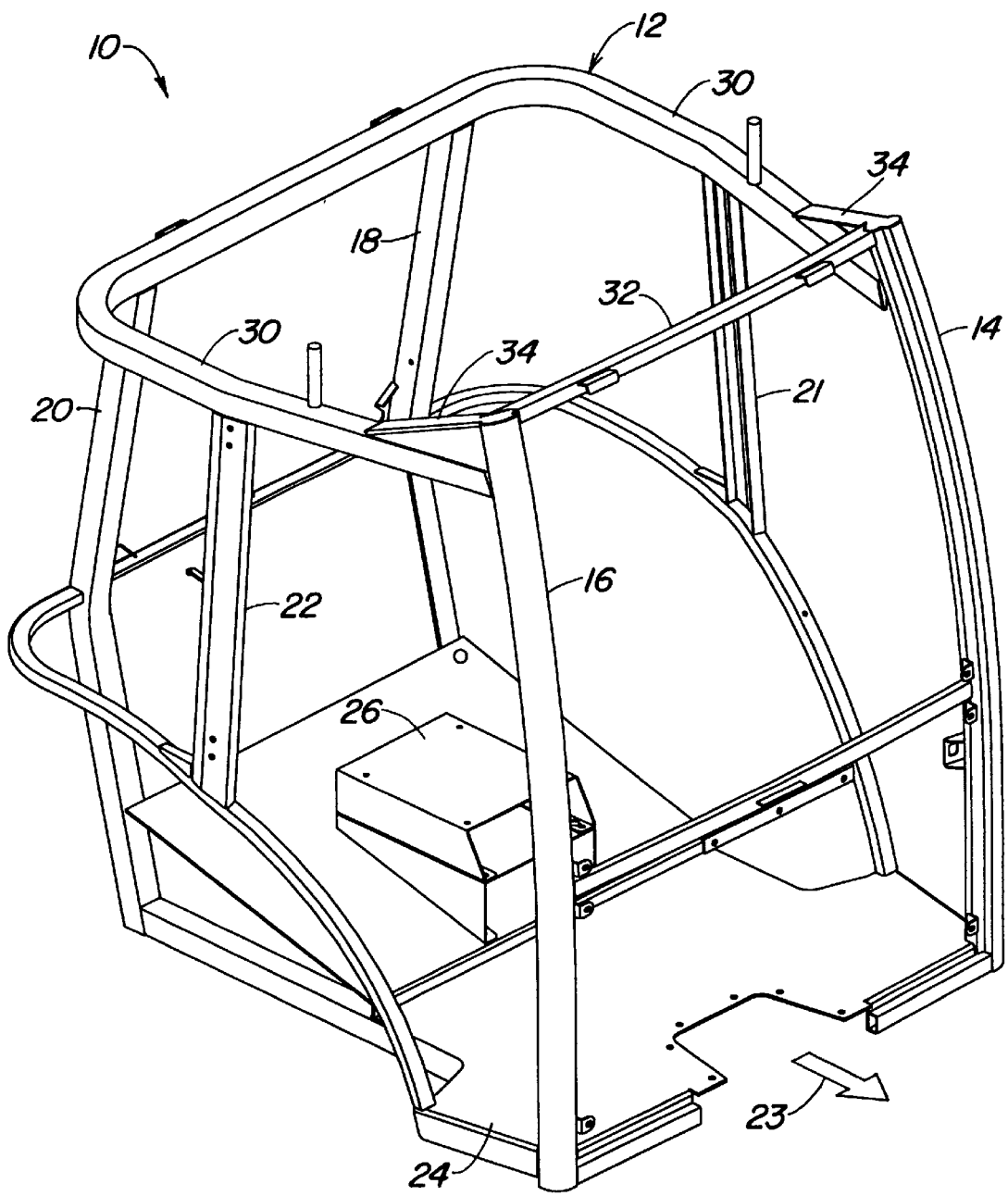
FIG. 1 is a perspective view of the rollover protective structure and floor of the operator enclosure of the present invention.

The operator enclosure for an agricultural tractor of the present as shown in FIG. 1 and designated generally at 10. The enclosure 10 includes a rollover protective structure (ROPS) 12 that includes left and right front upright corner members 14, 16 respectively as well as left and right rear upright members 18 and 20. The ROPS generally defines front, left, right and rear sides of the enclosure with the front and right sides facing the viewer in FIG. 1. The front, or forward, direction is shown by the arrow 23. The designations left and right as used herein are when facing the forward direction shown by the arrow 23. Left and right intermediate upright members 21, 22 are located along the left and right sides of the ROPS. The operator enclosure includes a floor 24 that is flat between the left and right sides and between the enclosure front side and the seat pedestal 26.

The upper end of the ROPS is defined along the left, right and rear sides by a horizontal member 30. The front left and right corner members 14 and 16 extend upwardly above the horizontal member 30 and terminate at a front upper cross member 32. The front upper front cross member 32 is thus spaced above the horizontal member 30 on the left, right and rear sides of the ROPS. A triangular shaped reinforcing gusset 34 is positioned above the upper horizontal member 30 and rearward of the front upright corner members 14 and 16 to provide additional support at the upper end of the front side. The operator enclosure may also include a falling object protective structure (FOPS) that is connected to and spans between the front upper cross member 32 and the horizontal members 30 on the left, right and rear sides of the ROPS.

Figure 4:
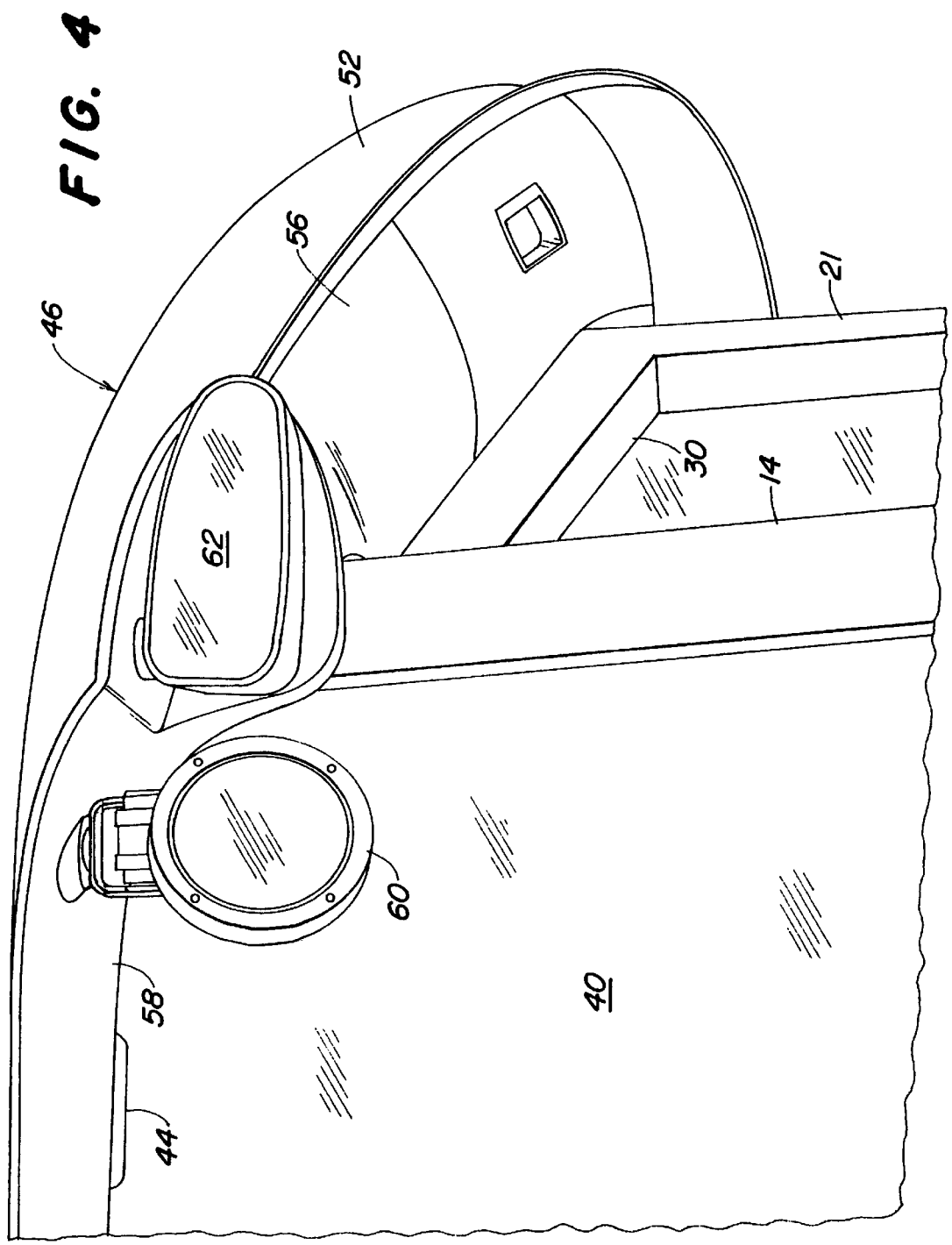
FIG. 4 is a perspective view of the upper left front corner, like FIG. 3, showing only the ROPS and the windshield.

A front windshield 40 is mounted to the ROPS and extends between the front upper cross member 32 and a lower cross member 42 and between the front corner members 14 and 16. With reference to FIG. 4, a clip 44 is shown at the top of the windshield to hold the windshield to the front upper cross member 32. Side window panes 45 are provided along the left and right sides, only one of which is shown in the drawings. The side window panes 45 may be fixed to the frame structure or part of a door that is rotatably mounted to the ROPS.

Figure 2:
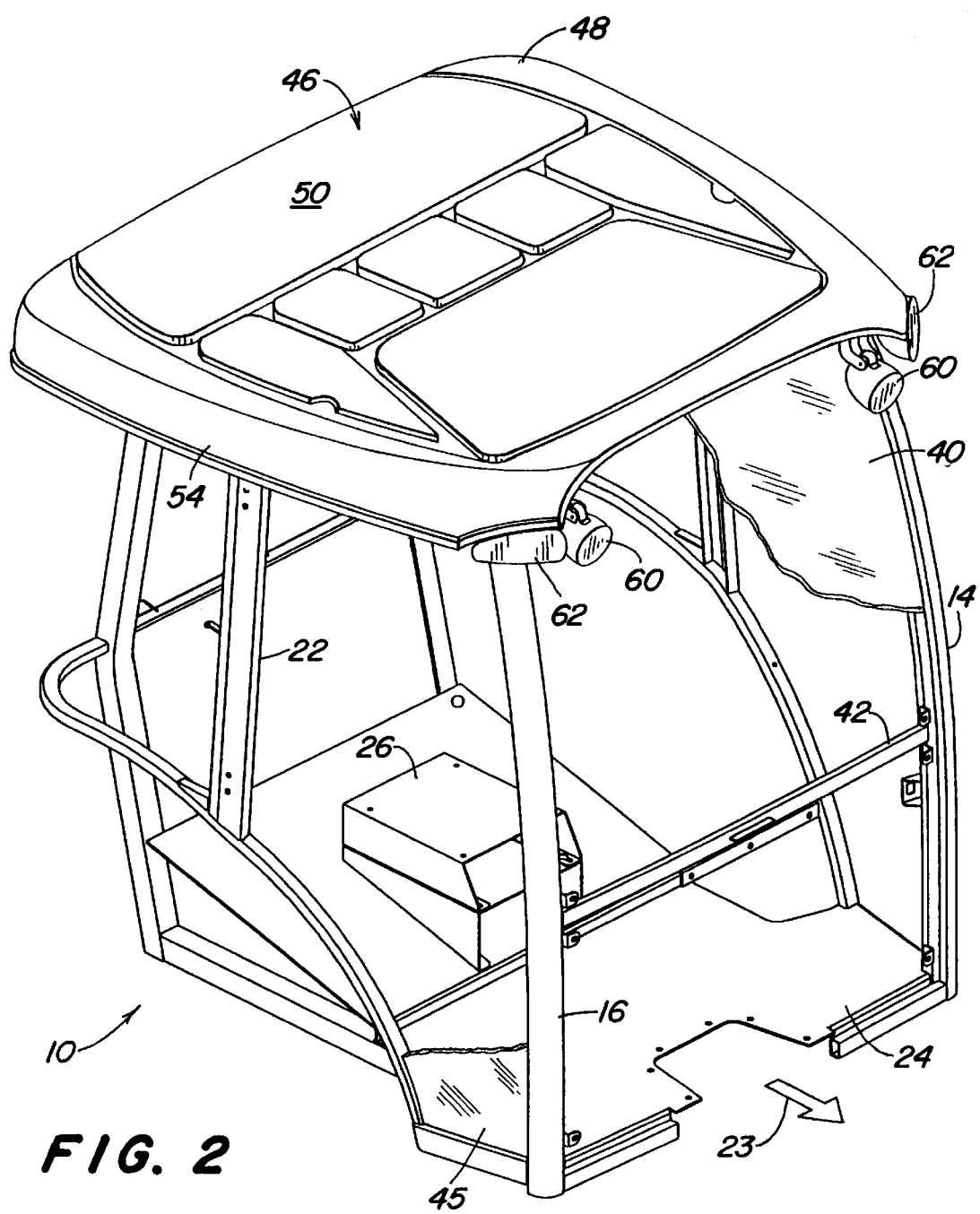
FIG. 2 is a perspective view similar to FIG. 1 showing the ROPS together with the front windshield and roof pan.
Figure 3:
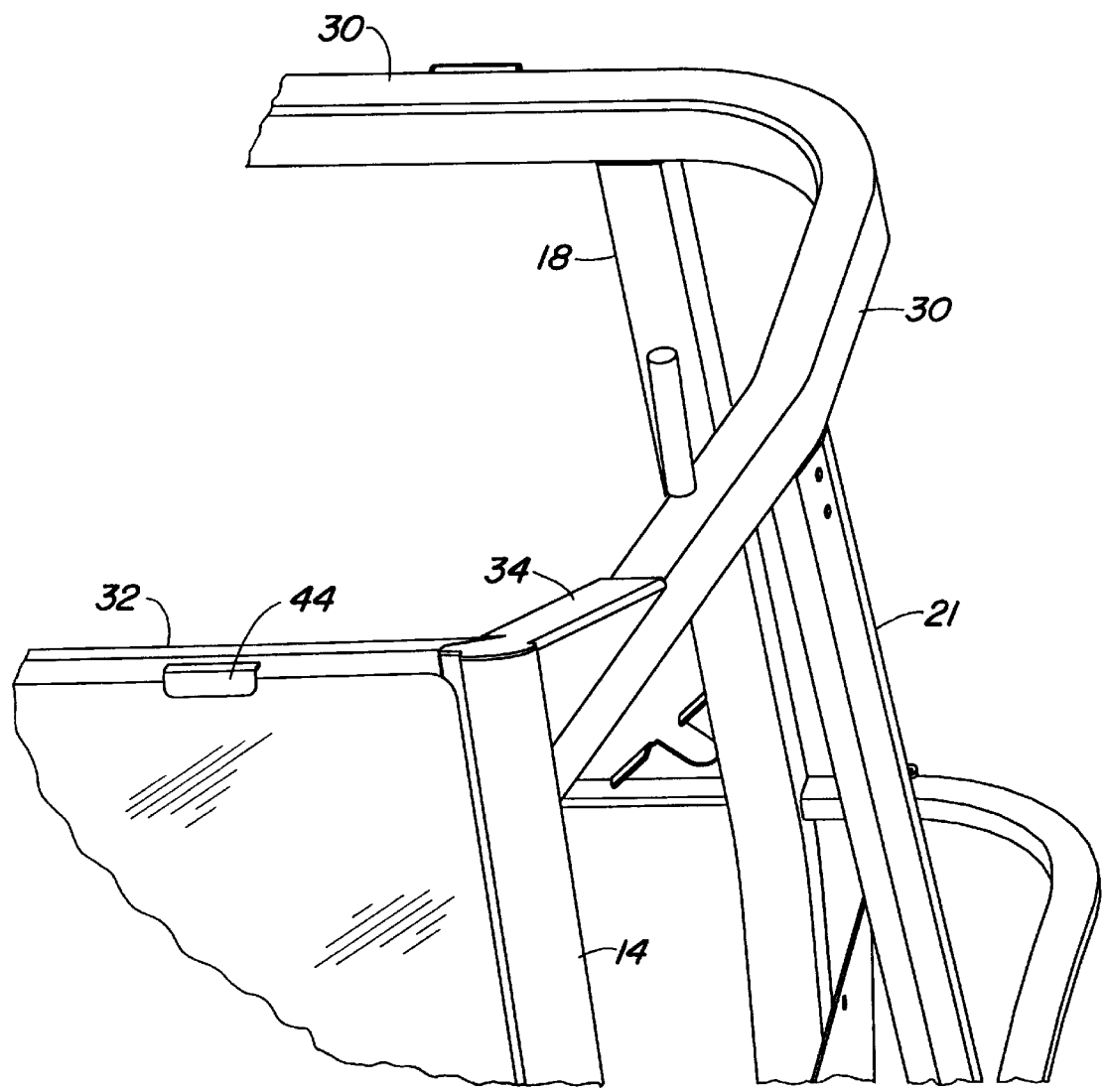
FIG. 3 is an enlarged perspective view of the upper left front corner of the enclosure showing the ROPS, windshield and roof pan.

Referring to FIG. 2, the operator enclosure is shown with a roof assembly 46. The roof assembly 46 includes a roof pan 48 having a generally horizontal top panel 50 that is placed slightly at or above the front upper cross member 32. The roof pan is bent downward along the left, right and rear sides to form left and right side panels 52, 54 shown in FIGS. 4 and 2 respectively, and a rear side panel (not shown). The roof overhangs the ROPS both laterally and forwardly. A soffit 56, shown in FIG. 4, extends between the left side panel 52 and the upper horizontal member 30. Likewise, a front soffit 58 extends between the front edge of the top panel 50 and the windshield 40.

Left and right front headlights 60 are mounted to the roof assembly 46 and hang down from the soffit, in front of the windshield 40, at the upper corners thereof. Side marker lamps 62 are also mounted to the soffit outboard of the headlights 60.

The invention is directed to the ROPS having a raised front side relative to the left and right sides to improve forward visibility. The rear side has been shown as having the same height as the left and right sides. The rear side could be higher or lower than the left and right sides.

The operator enclosure of the present invention provides greater upward visibility by extending the ROPS and windshield upwardly on the front side of the enclosure into what was previously part of the roof assembly. This added visibility is particularly advantageous when operating a front-end loader to view the bucket when raised. This is made possible by revising the roof to eliminate the downwardly extending front panel at the front of the roof and by extending the windshield upward. Front lights are still provided on the roof by hanging the lights from the roof in front of the windshield, at the two upper corners.

The invention should not be limited to the above-described embodiment, but should be limited solely by the claims that follow.

We claim:

1. An operator enclosure for an agricultural tractor comprising:
   a rollover protective structure (ROPS) defining front, left, right and rear sides with the front side extending upwardly beyond upper ends of the left and right sides; and
   a roof pan having an upper, generally horizontal top panel above an upper end of the front side of the ROPS and downwardly depending left and right side panels extending from the top panel to the upper ends of the left and right sides of the ROPS.

2. The operator enclosure as defined by claim 1 wherein the ROPS includes a plurality of upright members including left and right front upright corner members, a front upper cross member extending between the left and right upright corner members at the upper ends thereof and an upper horizontal member at the upper ends of the left and right sides at a height that is lower than the front upper cross member.

3. The operator enclosure as defined by claim 2 further comprising a front windshield between the left and right front upright corner members that extends upwardly to the front upper cross member and side window panes on the left and right sides that extend upward to the upper horizontal members at the upper ends of the left and right sides.

4. The operator enclosure as defined by claim 2 further comprising a reinforcing gusset extending rearwardly and downwardly from the left and right front upright corner members at the upper ends thereof to the upper horizontal member at the upper end of the left and right sides.

5. The operator enclosure as defined by claim 3 further comprising lights carried by the roof pan in front of left and right upper corners of the windshield.

6. The operator enclosure as defined by claim 1 wherein the roof pan extends forward of the ROPS front side and further comprising at least one light carried by the roof pan forward of the front side of the ROPS.

7. The operator enclosure as defined by claim 1 wherein the roof pan extends forward of the ROPS front side and extends laterally beyond the ROPS on the left and right sides.

8. The operator enclosure as defined by claim 1 further comprising a flat floor extending between the left and right sides of the ROPS immediately rearward of the front side.

9. An operator enclosure for an agricultural tractor comprising:
   a rollover protective structure (ROPS) defining front, left, right and rear sides, the ROPS having a pair of front upright corner members and a front upper cross member extending between the front upright corner members at upper ends thereof and a generally horizontal upper member at the upper end of the left and right sides positioned at a lower height than the front upper cross member; and
   a roof pan having an upper, generally horizontal top panel above the front upper cross member and having downwardly depending left and right side panels that extend from the top panel to approximately the height of the upper end of the left and right sides of the ROPS.

10. The operator enclosure as defined by claim 9 further comprising a front windshield between the front upright corner members that extends upwardly to the front upper cross member and side window panes on the left and right sides that extend upward to the upper horizontal members at the upper ends of the left and right sides.

11. The operator enclosure as defined by claim 9 further comprising a reinforcing gusset extending rearwardly and downwardly from the front upright corner members at the upper ends thereof to the upper horizontal member at the upper end of the left and right sides.

12. The operator enclosure as defined by claim 10 further comprising lights carried by the roof pan in front of left and right upper corners of the windshield.

13. The operator enclosure as defined by claim 9 further comprising a generally flat floor extending between the left and right sides of the ROPS immediately rearward of the front side.

* * * * *